July 21, 1953     T. R. WARNER     2,645,889
COACTING ENDLESS CHAIN TYPE ONION HARVESTER
Filed Sept. 14, 1949     3 Sheets-Sheet 1
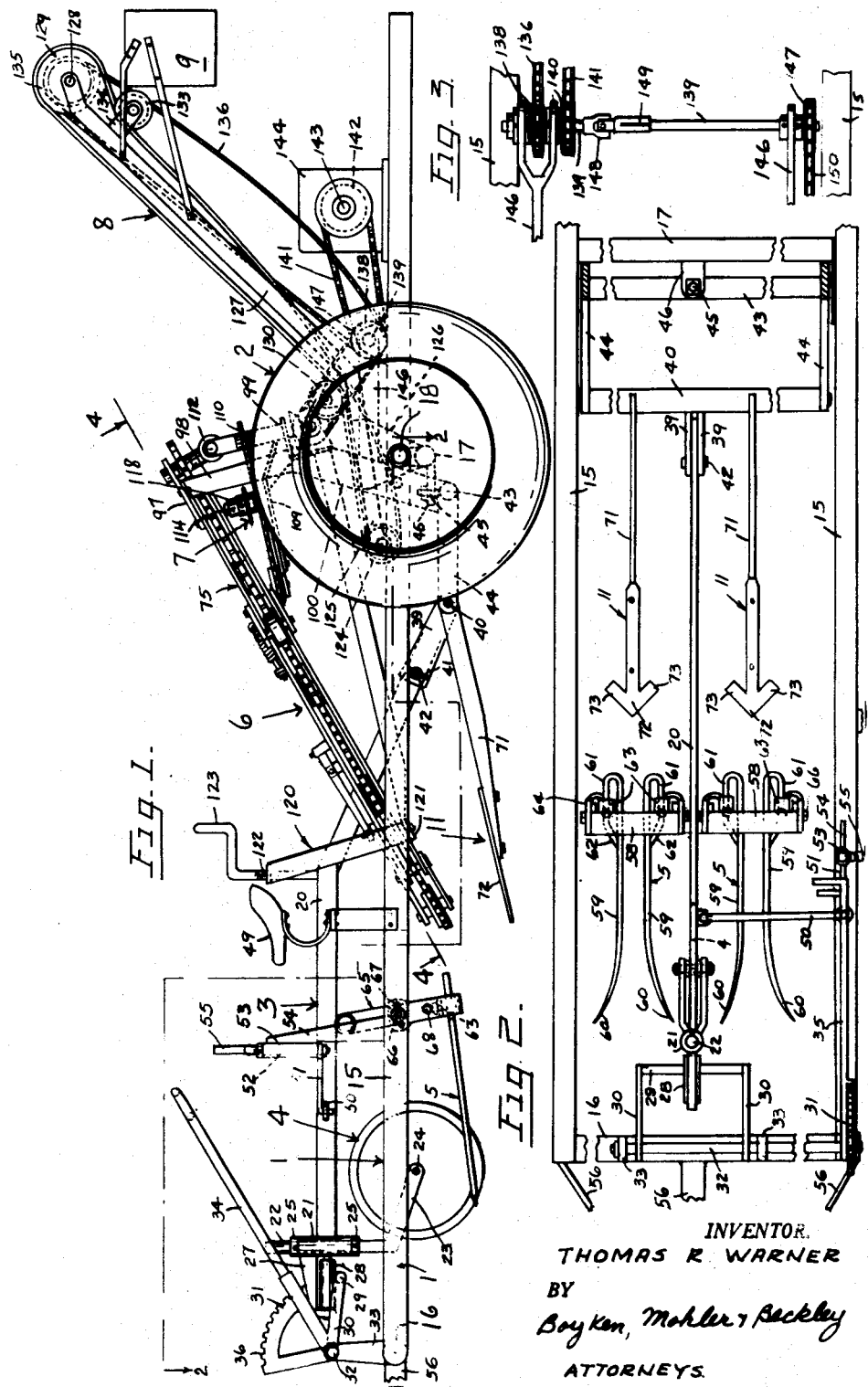
INVENTOR.
THOMAS R. WARNER
BY
Boyken, Mohler y Beckley
ATTORNEYS.

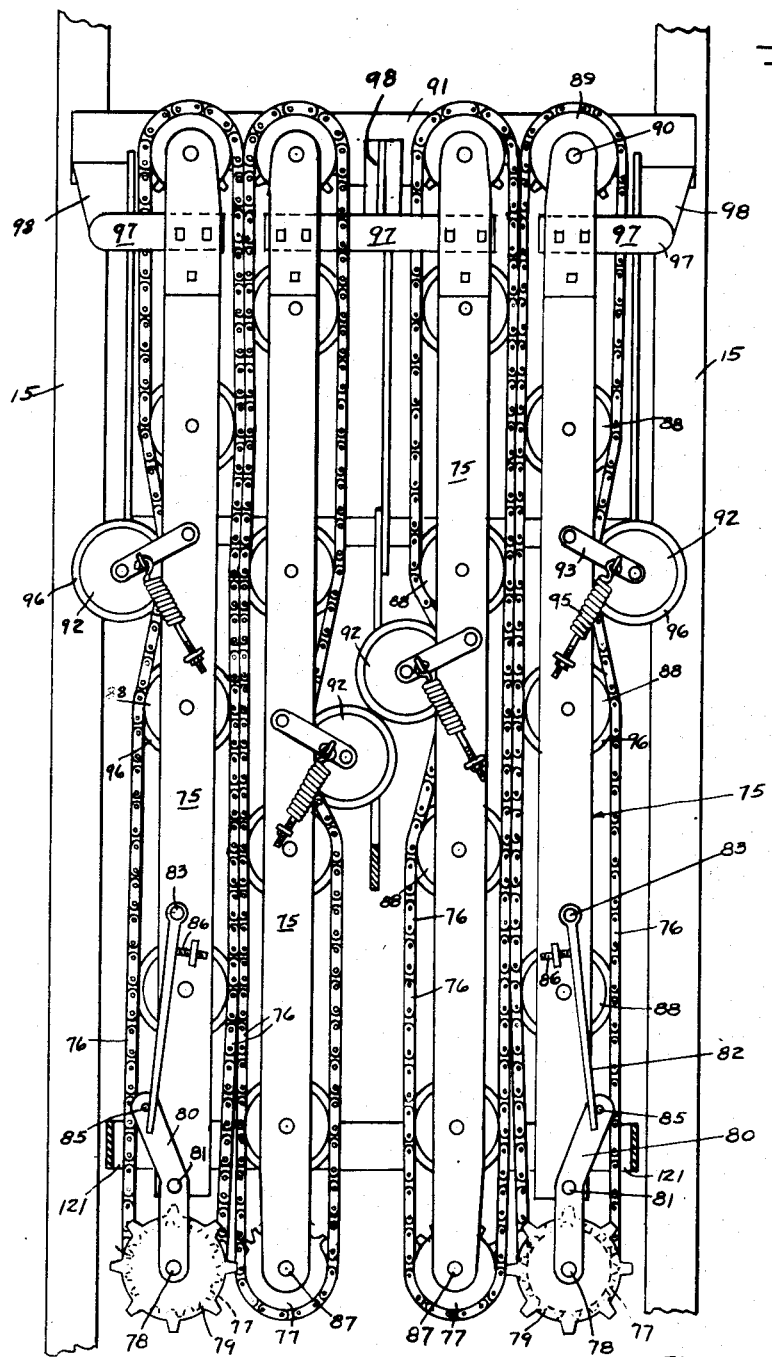

July 21, 1953  T. R. WARNER  2,645,889
COACTING ENDLESS CHAIN TYPE ONION HARVESTER
Filed Sept. 14, 1949  3 Sheets-Sheet 3
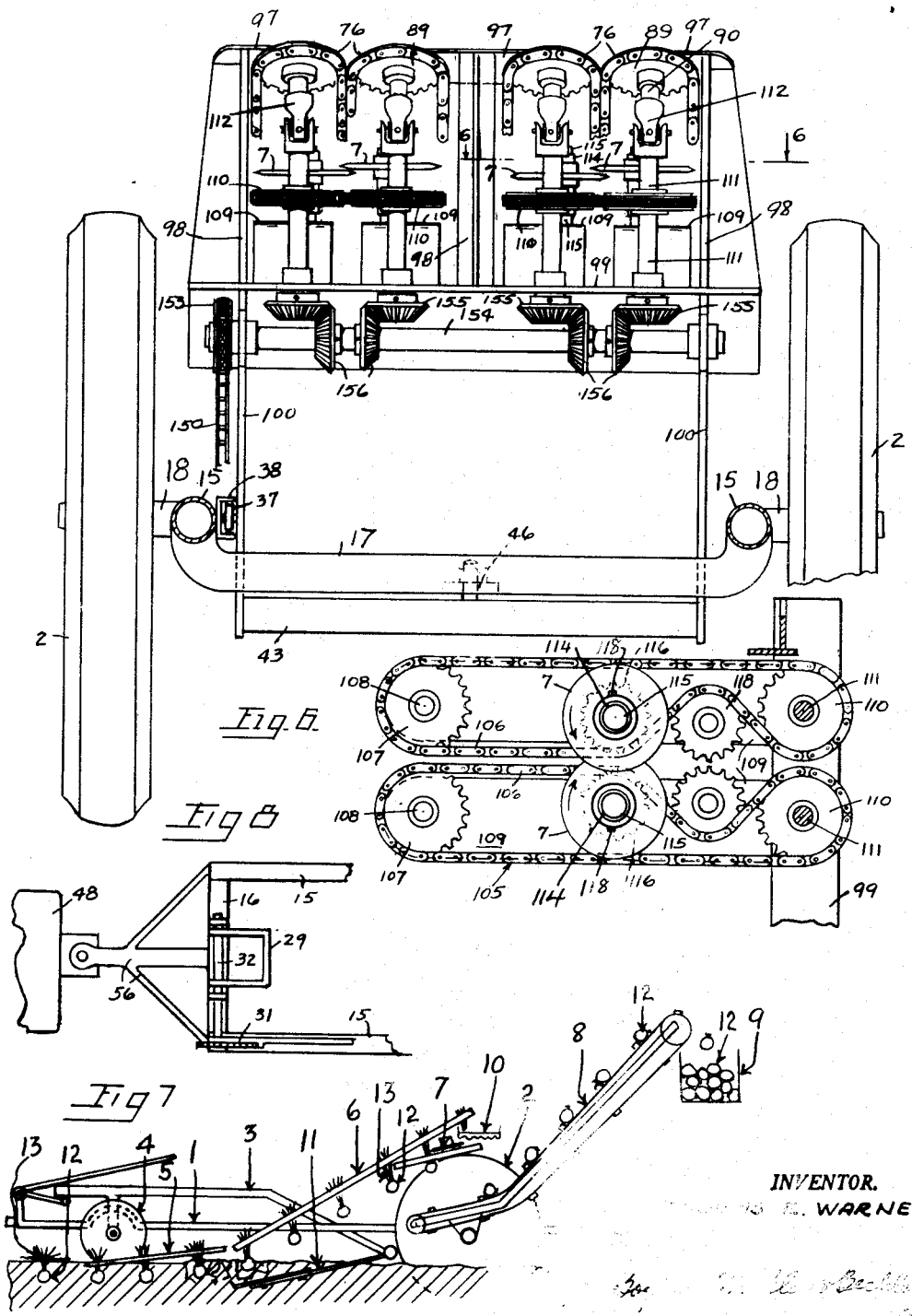
INVENTOR.
T. R. WARNER Patented July 21, 1953

2,645,889

UNITED STATES PATENT OFFICE 2,645,889

COACTING ENDLESS CHAIN TYPE ONION HARVESTER

Thomas R. Warner, Gonzales, Calif.

Application September 14, 1949, Serial No. 115,591

11 Claims. (Cl. 55—108)

This invention relates to an onion harvester, and the like, and has for one of its objects the provision of a harvester that is adapted to more efficiently remove the onions from the ground than heretofore, and which harvester is provided with means for topping the onions and for collecting the latter separate from the tops after the topping operation.

When onions are ready for harvesting, the tops are usually lying on the ground extending partially or wholly across the space between rows thereof. Harvesters have been developed that have been intended to lift the tops and to pull the onions from the ground, but with little success. In prior harvesters, only a very small variation in the path of the machine results in failure to satisfactorily elevate the tops, and after the tops are elevated, the remaining structure has been incapable of properly gripping the tops for exerting the upward pull on the onions to lift them from the ground.

One of the objects of the present invention is the provision of a harvester in which the above mentioned objections and disadvantages are overcome.

Still another object of the invention is the provision of a relatively flexible section of the harvester that can readily be controlled by an operator for quickly elevating and for lowering said section and for moving the same to follow the row of onions independently of the main ground wheels that directly support the remainder of the harvester for movement over the ground.

An additional object of the invention is the provision of simple structure in a harvester for onions and the like in which the top-elevating means, lifting conveyor and topping means are on a unit that is readily and quickly detached from the remainder or main frame of the vehicle, and which remainder includes ground wheels for supporting the latter for movement over the ground, said top-elevating means, lifting conveyor and topping means are swingable laterally and vertically on said main frame and are adapted to be driven by power means carried by said main frame.

Another important object of the invention is the provision of adjustable means in a beet, onion or similar harvester that provides for topping the vegetables uniformly and at any desired distance from the root portion.

Other objects and advantages will appear in the description and in the drawings.

It is to be understood that the words "onion harvester" in the description and claims are not intended to restrict the invention to a machine suitable only for harvesting onions. The harvester is for any crops that are harvested in a manner similar to onions, or that may be so harvested.

In the drawings:

Fig. 1 is a side elevational view of the harvester, but without side delivery chutes for the onion tops.

Fig. 2 is a fragmentary sectional view of part of the harvester taken substantially along line 2—2 of Fig. 1 and with parts removed.

Fig. 3 is an enlarged fragmentary top plan view of the driving connection between the source of power and the onion pulling mechanism and draper.

Fig. 4 is an enlarged plan view of the onion pulling mechanism as seen substantially along line 4—4 of Fig. 1.

Fig. 5 is a sectional fragmentary view to illustrate the drive for the onion pulling and topping mechanism, said mechanism being shown in elevation, and only the main frame being indicated in cross section.

Fig. 6 is a plan view of the onion topping mechanism separate from the machine, but with the drive shifts and part of the frame being indicated in section.

Fig. 7 is a diagrammatic view of the harvester as seen from the side.

Fig. 8 is a reduced plan view of the connection between the main frame and a tractor.

In the main, Fig. 7 illustrates the invention in a greatly simplified form, and comprises a main vehicle frame 1 supported on a pair of ground wheels 2 adjacent its rear end with respect to the normal forward travel of the harvester when it is in operation.

An auxiliary frame 3 is vertically and laterally swingable on the main frame, said auxiliary frame being pivotally connected at its rear end to said main frame and supported at its forward end on a caster type single wheel 4 and which wheel 4 also supports the forward end of the main frame in a novel manner that will be hereinafter described more in detail.

The auxiliary frame 3 carries the elements 5 for lifting the onion tops off the ground and for guiding them to a conveyor 6 that grips said tops and that pulls the onions from the ground as the harvester moves in its forward path.

After the onions are pulled from the ground and are suspended from the conveyor 6 that carries them rearwardly and upwardly, the tops are severed from the onions by a topping knife 7 and the onions are then free to drop onto a slat conveyor 8 or the like that carries them to a collecting receptacle or hopper 9 carried on the main frame, while the severed tops are carried away by the conveyor 6 and are discharged onto a laterally directed chute 10 or into any suitable receptacle.

A soil loosener 11, also on the auxiliary frame 3, functions to loosen the soil around the onions at a time just prior to the moment when the conveyor 6 exerts its upward pull on the tops, and during said pull thus facilitating the removal of the onions from the ground without pulling the tops off said onions. The onions are indicated generally at 12, and their tops at 13.

As will later be explained, more in detail, the auxiliary frame 3 is readily swingable laterally at its forward end relative to main frame 11, by an operator on the harvester and while the harvester is moving forwardly.

The main frame

The main frame 1, comprises a pair of horizontally extending, parallel, spaced, side frame members 15 that extend longitudinally of the harvester and parallel with its normal direction of travel. Said frame members are connected at their forward ends by a transversely extending cross frame member 16 (Figs. 1, 2). A cross frame member 17 may connect said side frame members 15 adjacent, but spaced from the rear end of the harvester, and axles 18 at the ends of said member 17 carry the ground wheels 2 (Fig. 5). Any desired number of transverse cross frame members or braces may be employed to give the requisite strength and rigidity to the main frame or for supporting other parts of the machine.

The auxiliary frame

The auxiliary frame 3 comprises a single central frame member 20 that is centrally between side frame members 15 (Fig. 2), and which member 20 carries a vertical bearing 21 at its forward end in which the vertical post 22 of the front ground wheel 4 is rotatable. Said post is formed with a rearwardly extending fork 23 at its lower end between which said wheel 4 is supported on a horizontal axle 24 for rotation. Collars 25 respectively secured to post 22 above and below the bearing 21 function as thrust bearings and for supporting the post against vertical reciprocation in said bearing 21.

From the foregoing, it will be seen that the wheel 4 has a caster or trailer type support that permits the wheel to follow any directional movement of the front end of the auxiliary frame.

A bracket 27 extends forwardly of the bearing 21 and is rigidly secured to the latter. Said bracket rotatably supports a roller 28 that extends longitudinally of the harvester, and which roller is below said bracket and is rotatable on a transversely extending track 29 (Fig. 2).

Front support for auxiliary frame

The track 29 is carried by arms 30 that extend rearwardly from the front cross frame member 16 that connects the front ends of the side frame members 15.

The forward ends of arms 30 are secured to a horizontal shaft 32 that in turn is over and parallel with the cross frame member 16 and that is rotatably supported in suitable bearings 33 on said frame member and extending upwardly therefrom (Fig. 1).

A quadrant 31 is rigid with one of said bearings 33 and a lever arm 34 secured to the shaft 32 is swingable relative to said quadrant about the axis of said shaft for rotating the latter, and for elevating and lowering the track 29 upon such swinging of said lever arm. A conventional releasable locking element connected with a manually reciprocable rod 35 is adapted to engage between any desirable adjacent pair of teeth 36 on quadrant 31 for locking the lever at any desired point in its swinging movement.

Rear support for auxiliary frame

The central auxiliary frame member 20 is at a substantially higher level at its forward end than the level of the frame members 15, and at a point intermediate its ends, said member 20 extends slantingly downwardly, to a point about even with the level of side frame members 15, but slightly below said level, and at which latter point the said member 20 extends between a pair of arms 39 that are secured to a sub cross frame member 40, that is part of the auxiliary frame. The said arms 39 are formed with corresponding slots 41, and a horizontal bolt 42 extends through said slot and the rear end of member 20 for bolting the latter to said arms at any desired degree of angular adjustment between said arms and said member.

The sub cross frame member 40 is connected with a similar sub cross frame member 43 rearwardly thereof but parallel therewith, by means of end frame members 44 that are parallel with the central member 20, and pivotally connected with member 40.

Centrally between the ends of said frame member 43 is a vertically extending bolt or pivot 45 that extends through a lug 46 secured to said cross frame member 17 that connects the frame members 15.

This pivot 45 suspends the rear end of the auxiliary frame from the main frame, and the opening in lug 46 through which said pivot extends is sufficiently loose to permit vertical and lateral swinging of said auxiliary frame about said pivot.

The forward end of frame 15 is rigid with a drawbar 56 that in turn is supported at its forward end on a tractor 48 (Fig. 8) so upon swinging lever 34 upwardly the front end of the auxiliary frame will swing up about pivot 45.

In order to prevent objectionable tipping of the auxiliary frame about its longitudinal axis and relative to the main frame, a projection in the form of a roller 37 may be carried by the members that are secured to said auxiliary frame by any suitable means, and which roller extends horizontally into a laterally opening, horizontally extending channel 38 secured to the inner side of one of the side frame members 15 of said main frame. This roller may be fairly loose in the channel so as not to bind upon such slight angular adjustments as may be made between the main and the auxiliary frames by means of lever 34 (Fig. 5).

Lateral swinging of front end of auxiliary frame

A seat 49 is secured to one of the frame members 15 (the near one as seen in Fig. 1) and at a point where the operator can manipulate lever 34 and other control levers. At said point the operator has a clear view of the elements 5 for elevating the tops, and this is important for the reason that means is provided whereby he can guide said elements.

This means comprises a horizontally extending link 50 (Fig. 2) that is vertically pivoted at one end to the forward end of the auxiliary frame at a point spaced rearwardly of the bearing 21, and the other end of the link 50 is vertically pivoted to the outer end of a horizontally extending arm 51 (Fig. 1). The other end of arm 51 is secured to the lower end of a vertical shaft 52 that is rotatable on its axis in a vertical bearing 53 carried by frame 15 by means of a bracket 54 (Fig. 1). The upper end of the shaft 52 is connected with a horizontally extending handle 55 adapted to be grasped by an operator on seat 49. By moving said handle in one direction or the other, the forward end of the auxiliary member will be moved laterally in one direction or the other according to how the handle is moved. Thus the operator has full control of just what path the elements 5 will follow, and he can cause said elements to accurately follow the rows of onions irrespective of variations in the path of travel of the main frame. The latter is adapted to be drawn by a draw bar 56 at its forward end as has been described.

Top lifting elements

The top lifting elements 5 are secured to the auxiliary frame 3 by means of a cross bar 58 that extends below the auxiliary frame member 20 and that is welded to the latter.

In Fig. 2, there are two sets of top lifting elements, inasmuch as the harvester illustrated is designed to harvest two rows of onions at a time. Obviously the harvester could be designed to harvest any number of rows from one up, but usually a two row harvester is found to be most practical.

Each set of top lifting elements comprises a pair of elongated rods 59 that extend along side each other in horizontally spaced relationship. Said rods extend slantingly downwardly in a forward direction relative to the normal path of travel of the harvester, and the lower forward ends 60 of each pair are pointed and extend divergently outwardly from each other.

The rear upper ends of each set of rods 59 are formed with return bends 61 that are at the opposite outwardly facing sides of said upper ends which return bends then extend slantingly back at 62 toward the rod carrying the same and into engagement with the latter. The return bend at the upper end of each rod 59 provides a loop at each upper end that is elongated longitudinally of the rod, and the return bend of each rod is secured by a clamp 63 to the lower section 64 of a hanger 65 that in turn depends from cross bar 58. Said lower end section is adjustably secured to the lower end of hanger 65 by means of a bolt 66 that extends through an opening in the lower end of hanger 65 and through an arcuate slot 67 in the upper end of said lower section. Thus the rods 59 may be secured at any desired angle relative to the ground and the clamps 63 can be loosened so that the rods may have a longitudinal adjustment. The arc of slot 67 is developed about a bolt 68 that is below the bolt 66 and the lower end of each hanger 65 is formed with a slot 69 extending longitudinally thereof so that the rods may be raised and lowered bodily and secured rigidly at the desired elevation.

The spacing between the two sets of rods 59 is equal to that of the rows of onions, and normally the pointed forward ends of the rods are positioned to just skim under the surface of the ground.

The spacing between the rods of each set thereof is such that the rods of each set will be positioned at the opposite sides of a row. The pointed forward ends will pass below the flat lying tops of the onions and will elevate said tops. As the harvester moves forwardly, the elevated tops will be guided between the parallel runs of rods 59, being elevated further all the while.

The slanted forward ends 62 of the return bends 61 prevent any weeds etc. from being caught in the loops at the upper ends of rods 59, and there is nothing between the rods to prevent the onion tops from sliding smoothly upwardly over them, even when they overlie said rods.

Soil and onion loosening members

Each of the soil loosening members 11 (there being one for each set of elements 59) comprises a forwardly and downwardly inclined bar 71 that is secured at its rear end to the sub frame member 40, the latter extending transversely of the harvester at a point forwardly of the cross frame member 43.

The forward end of each bar 71 carries a flat, pointed, forwardly directed spade 72 having rearwardly extending coplanar flat generally horizontally disposed arms 73.

These looseners or spades 72 are adapted to enter the ground or soil at a level below the onions and where the onions are first pulled upwardly by means which I will now describe.

Onion-top gripping conveyor

Each onion-top gripping conveyor comprises a forwardly and downwardly inclined frame 75 that supports two sets of endless chains 76, each set of chains being a pair and the chains being coplanar with an inclined plane in which the frame 75 is disposed.

At the forward lower end of frame 75, two sets of equal sized sprockets 77 are supported for rotation about axes extending normal to the plane in which said chains are disposed.

These sprockets 77 are in a horizontal row extending transversely of the path of travel of the harvester. The outer end sprockets 77 of said row are carried on shafts 78. The upper end of each shaft 78 has a larger diameter radially toothed wheel 79 secured thereto. Shafts 78 are respectively journalled at their ends in arms 80 that extend generally longitudinally of frame members 75 and said arms are pivoted at points intermediate their ends to the lower ends of frame members 75, it being understood that said frame members 75 are spaced vertically, there being an upper and a lower one for the sprockets carrying each of said endless chains. These pivots are indicated at 81 (Fig. 4).

The upper ends of arms 80, which are opposite the ends carrying the wheels 79, are yieldably held against inward lateral movement by the outer lower ends of elongated leaf springs 82. Each leaf spring is pivotally connected at its upper end to one of the upper frame members 75 that carry arms 80, said pivots being indicated at 83. Pins 85 on the upper rear ends of arms 80 engage the free lower ends of said springs. At a point along the opposed inner side of each of the springs 82 each spring is engaged by an adjusting bolt 86 that threadedly extends through a bracket secured to each upper frame member 75 that carries arms 80. Upon screwing each bolt in one direction, the sprockets on shafts 78 are permitted to move oppositely outwardly greater distances before the resistance of springs 82 is encountered.

The other sprocket 77 of each set that is in the row at the lower ends of frame members 75 is on a shaft 87 that is directly journalled in a set of superposed spaced frame members 75. The frame members that carry sprockets 77 are sufficiently longer than the frame members that carry the arms 80 to position the shafts 87, in line with shafts 86.

At spaced points upwardly between the superposed sets of spaced frame members 75 are rollers or wheels 88 that are on shafts journalled at their ends in said frame members; and the upper ends of the sets of endless chains pass around sprockets 89. Each of the sprockets 89 is on a shaft 90 that is journalled in an upper cross frame member 91 (Fig. 4).

Chain tightener rollers or wheels 92 are carried at the outer ends of arms 93 that, in turn, are pivotally secured at their opposite or inner ends to the upper and lower frame members 75 at points intermediate the upper and lower ends of the latter.

A tension spring 95 connects each arm 93 with the frame member supporting each arm for yieldably holding the roller 92 against the opposite outer stretch of chain of each set of conveyor chains. By this arrangement, the adjacent sides of adjacent stretches of chain of each conveyor are uninterrupted from end to end and onion tops can fit between said stretches at their lower ends as they pass from the top elevating elements 5 will be gripped between the adjacent sides of said adjacent stretches and will be carried up said conveyors for discharge at their upper ends.

As seen in Fig. 4 a pair of the rollers 88 are journalled at their ends in the frame members 75 between the opposite stretches of each conveyor chain, and which rollers are disposed at points at opposite upper and lower sides of the rollers 92 thereby facilitating the tightening of the chains by the latter rollers. Also adjacent the lower end of each conveyor in line with the said pair of rollers 88 is another roller 88. The rollers 88 and the chain tightening rollers 92 are each formed with a lower flange 96 on which the chain adjacent thereto may be supported.

It is pertinent to note that the upper ends of the upper frame members 75 are supported on cross frame members 97 that in turn are supported on upwardly extending posts 98 (Fig. 1). Said posts are secured adjacent their lower ends to a cross frame member 99, as by welding or by any other suitable means. Downward extensions 100 of the two outer posts 98 are integrally secured to the ends of the rear sub cross frame member 43 that in turn is suspended by bolt 45 from lug 46.

*Onion topper*

Below the upper end of the common gripping conveyor chains 76 are other relatively short sets of endless chains 105 (Figs. 1, 6).

These chains are also in pairs, there being one pair below the one set of conveyor chains 76 and the other pair being below the other set of conveyor chains, and the adjacent reaches 106 are substantially below the adjacent reaches of the conveyor chains 76 thereabove. However the adjacent reaches 106 are preferably slightly spaced apart inasmuch as they are not gripping chains. This space is insufficient for onions to pass through.

The chains 105 are coplanar and are disposed in a plane that is at an angle to that in which the chains 76 are disposed being more nearly horizontal. The forward ends of chains 105 extend around sprocket wheels 107 that are carried on shafts 108 that in turn are journalled at their lower ends in frame members 109 that in turn are secured at one of their ends to the cross frame member 99.

The upper ends of said chains extend around sprocket wheels 110 that are secured on shafts 111, said shafts 111 rotatably extending at their lower ends through the frame member 99 and being connected at their upper ends through universal joints 112 with the shafts 90 to which the upper sprocket wheels 89 of conveyor chains 76 are secured.

Between the opposed stretches of each chain 105 at a point about midway between sprocket wheels 107, 110 is a shaft 115 that is secured rigidly to frame member 109. Each shaft has a sprocket wheel 116 secured to a sleeve 114 that is rotatable on shaft 115, the teeth of which sprocket engage the stretch 106 of chain 105 that is adjacent thereto for being driven by said stretch.

The upper end of each sleeve 114 carries a circular cutter 7 that is vertically adjustable on sleeve 114 by set screws 118. The cutters 7 overlap each other at their adjacent sides.

The stretches 106 of said chains 105 are held in engagement with a plurality of the teeth of sprockets 116 by idler chain tightening sprocket wheels 118, mounted on frames 109 to force adjacent stretches 106 oppositely outwardly relative to each other and partially around sprocket wheels 116.

By the foregoing structure, the onions suspended from their tops by the top gripping conveyors 76 will pass below the adjacent stretches of chains 106 and as the tops are carried upwardly by chains 76 the onions will move below stretches 106 and be aligned therebelow by said chains and the tops will be severed by cutters 7. The onions are then free to drop, but the tops will continue upwardly for discharge from chains 76 into chute 10 (Fig. 7).

An inverted U-frame 120 has the lower ends of its legs secured to horizontally inwardly extending arms 121 that extend below the lower frame members 75 and to which they are secured.

Extending threadedly through the closed door upper end of said frame 121 is a screw 122 having a handle 123 at its upper end for rotating said screw. The lower end of the screw engages the frame member 20. By rotating said screw in one direction, the lower ends of conveyors 76 will be lowered relative to the top lifting elements 5 and soil looseners 11 and by rotating the screw in the other direction, their lower ends will be raised, and this upward and downward swinging will be about an axis extending through lug 46, the topping device swinging with the conveyors 76 as a unit.

*Onion conveyor*

Extending below the point where the onions are severed from the tops by knives 7, is a generally horizontally and rearwardly extending forward end portion of the slat conveyor 8. The forward end of said conveyor extends around a horizontal pulley 124 that is on a shaft journalled at its ends in the lower ends of a pair of spaced opposed frame members 125 that in turn are secured by members 126 to the bar 18 (Fig. 1). The frame members 125 extend generally horizontally at their lower ends and then angularly upwardly at 127 and the upper ends are journalled for shaft 128 of an upper pulley 129. At substantially the bend between the lower and the upper extending portions of said frame members 125 are hold-down rollers 130 that engage over the upper marginal portions of the conveyor 8 for holding the lower portion of said conveyor in a generally horizontally extending position between the lower end pulley 124 and said rollers 130.

From the upper pulley 129 the belt 8 extends over marginally engaging rollers 133 that are supported by brackets 134 secured to the upper ends of said frame member 125. And from said rollers 133 the belt extends to the lower pulley 124 and over the latter.

The upper shaft 128 also carries a sprocket wheel 135 over which an endless sprocket chain 136 extends. The lower end of said chain 136 extends over a sprocket wheel 138 that is secured on a shaft 139 (Fig. 3) which shaft 139 is journalled in bearings which are secured to a pair of arms 146. Onions 12 carried up conveyor 8 after the tops have been cut therefrom may be discharged into the receiver 9.

*Drive arrangement for conveyors and onion topping device*

As already explained, the chain 136 that extends over the lower sprocket wheel 138 also extends over the upper sprocket wheel 135 and the latter is secured on the same shaft 129 that carries the upper pulley 129. Hence, upon driving the sprocket wheel 138, the belt 8 will be driven.

Also secured on the shaft 139 (Fig. 3) is a sprocket wheel 140 and an endless chain 141 extends at one end over said sprocket wheel, while the other end of said chain extends over a sprocket wheel 142 that is on shaft 143 which in turn is driven by an engine 144. This engine, as seen in Fig. 1 is supported on the main frame 1 of the harvester adjacent its rear end.

The shaft 139 is journalled at its opposite ends in a bearing carried on the rear ends of arms 146 which arms project rearwardly from one of the downward extensions 100 of a post 98. The forward ends of said arm 146 are rigidly connected with said extensions 100 (Figs. 1, 3).

Shaft 139 is in two sections, one of which carries the sprocket wheels 138, 140 and the other of which extends is journalled in the rear end of arm 146 and which carries a sprocket wheel 147 adjacent said arm 146 (Fig. 3). A universal coupling 148 connects the two sections of shaft 139 adjacent sprocket wheel 140 and at a point between said sprocket wheel and the sprocket 147. Between said universal joint, there is a spline connection 149. The end of shaft 139 at arms 146 is held by suitable thrust bearings against longitudinal movement relative to said arm.

As best seen in Figs. 3, 5 a sprocket chain 150 extends over the sprocket wheel 147 and then over a sprocket wheel 153 that is in turn secured on one end of a shaft 154 (Fig. 5). Shaft 154 is journalled at its ends in bearings carried at the ends of the cross frame member 99. As already described, this cross frame member 99 is the one that carries shafts 111, said shafts 111 carrying the sprocket wheels 110 that drive the cutter wheels 7 and the chains 105. The upper ends of shafts 111 connect through universal joints 112 with the shafts 90. Shafts 90 carry the sprocket wheels 89 of the conveyor chains 76.

The shafts 111 each have a bevel gear 155 at its lower end below cross frame member 99, and shaft 154 carries bevel gears 156 the teeth of which engage those of bevel gears 155. The arrangement of said gears 155, 156 is such that upon rotation of said shaft 154 clockwise, as seen in Fig. 1 the sets of conveyor chains 76 will be actuated for carrying the onions upwardly, and the adjacent runs 106 of chains 105 will be actuated for guiding the onions rearwardly while the knives 7 will cut the tops from said onions. The onions from which the tops have been severed will drop out the lower generally horizontally extending run or stretch of the belt or slat conveyor 8 and the driving connections between the slat conveyor and the engine are such that the latter will convey the onions to the upper end of said conveyor for discharge into receptacle 9 or onto any other desired receiving device.

*Operation*

The operation has already been described in general, but in the field when the harvester is being drawn forwardly with the wheel 4 leading, the operator will be on the seat 49 which is at the near side of the harvester as seen in Fig. 1. In this position, he has a clear view of the top-lifting devices 5 and of the soil and onion looseners 11.

By manipulating the lever 50, he can guide the top-lifting elements along exactly the right path for elevating the onion tops so they will be gripped by the chains 76.

The toothed wheels 79 that are at the lower ends of the sets of conveyor chains 76 are quite important since they insure the tops being directed between the sets of conveyor chains.

The machine is readily adjustable to meet any contingency. Any of the frame members may be connected by bolts and slots, as has been explained in most instances, to provide for angular adjustment and extension or either one or the other alone.

Upon moving the lever 34 upwardly the forward end of the auxiliary frame will be elevated, including wheel 4, the elements 5, soil looseners 11 and conveyors 6. This movement is about a horizontal axis extending through bolt 45, sufficient "play" being permitted for such movement.

If the relationship between the top-lifting elements 5, soil looseners 11 and the lower end of conveyors 6 has to be changed, this is quickly accomplished by rotating the screw 122 in one direction or the other, since the frame member 20 that carries the elements 5 and soil looseners is adapted to pivot about a horizontal axis extending longitudinally of frame member 40, the ends of said member being journalled in the forward ends of arms 44.

One of the quite important features of the invention that should be noted is the means for aligning the root ends of the vegetables (whether beets, onions or any other vegetable the machine is adapted to harvest) before being cut by the cutters, so that all tops will be cut at exactly the same point relative to the root ends.

Since the cutters 7 can be moved from a plane practically against the chains 106 to a selected distance thereabove, the tops may be cut off directly next to the root ends or any desired distance therefrom. The method of pulling the onions (beets, etc.) from the ground by their tops and thereafter suspending them from their tops while moving them along a path of travel, then diverting the root ends for travel along an aligning path into alignment with each other along said later path while still suspending them from their tops and securing the tops from said root ends at a uniform distance from the latter, is a feature of the invention. The fact that the tops are pulled taut for cutting is also a feature of the invention inasmuch as this contributes to the uniform result.

It is understood that the forward end of the drawbar 55 is pivotally connected with the tractor 48 for lateral turning of the tractor in turning the machine, but said forward end is held by the tractor and supported thereby when the lever 34 is swung upwardly to elevate the forward end of the auxiliary frame. Hence the forward end of the auxiliary frame may be partially or wholly supported on the ground by wheel 4 while the forward end of the main frame is supported by the tractor.

It is to be understood that the invention as above described in detail is to be considered as merely illustrative of a preferred form of the device and the invention is not to be restricted to the precise details so described and illustrated.

I claim:

1. An onion harvester comprising a vehicle having a main frame and ground wheels supporting said main frame for movement in one general direction of travel over the ground, an auxiliary frame having a front end and a rear end and with the latter end supported on said main frame and with its front end leading relative to said direction of travel, elements spaced apart relative to said direction of travel and carried by said auxiliary frame adjacent its front end adapted to engage below the opposite sides of the tops of onions and elevate said tops when said tops are on the ground and the onions are in the latter, a top gripping conveyor extending slantingly rearwardly and upwardly from said elements for gripping the tops of onions when the tops are elevated by said elements and during forward movement of said main frame over the ground for pulling the onions from the ground, and means supporting said auxiliary frame on said main frame for lateral movement of its front end oppositely relative to said main frame, as desired, during said forward movement, and means carried by said main frame and connected with said auxiliary frame for so moving the front end of said auxiliary frame, said elements and said conveyor being movable with said auxiliary frame.

2. An onion harvester comprising a vehicle having a main frame and ground wheels supporting said main frame for movement in one general direction of travel over the ground, an auxiliary frame having a front end and a rear end and with the latter end supported on said main frame and with its front end leading relative to said direction of travel, elements spaced apart relative to said direction of travel and carried by said auxiliary frame adjacent its front end adapted to engage below the opposite sides of the tops of onions and elevate said tops when said tops are on the ground and the onions are in the latter, a top gripping conveyor extending slantingly rearwardly and upwardly from said elements for gripping the tops of onions when the tops are elevated by said elements and during forward movement of said main frame over the ground for pulling the onions from the ground, and means supporting said auxiliary frame on said main frame for lateral movement of its front end oppositely relative to said main frame as desired, during said forward movement, and means carried by said main frame and connected with said auxiliary frame for so moving the front end of said auxiliary frame, said elements and said conveyor being movable with said auxiliary frame, and earth engaging members secured to said auxiliary frame for movement therewith, said members being positioned for digging into the earth at a level below the onion when the tops of the latter are initially engaged by said conveyor for loosening said onions in the earth.

3. An onion harvester comprising a vehicle having a main frame and ground wheels supporting said main frame for movement in one general direction of travel over the ground, an auxiliary frame having a front end and a rear end with the latter end supported on said main frame and with its front end leading relative to said direction of travel, elements spaced apart relative to said direction of travel and carried by said auxiliary frame adjacent its front end adapted to engage below the opposite sides of the tops of onions and elevate said tops when said tops are on the ground and the onions are in the latter, a top gripping conveyor extending slantingly rearwardly and upwardly from said elements for gripping the tops of onions when the tops are elevated by said elements and during forward movement of said main frame over the ground for pulling the onions from the ground, and means supporting said auxiliary frame on said main frame for lateral movement of its front end oppositely relative to said main frame, as desired, during said forward movement, and means on said main frame and connected with said auxiliary frame carried by said main frame for so moving the front end of said auxiliary frame, said elements and said conveyor being movable with said auxiliary frame, a topping knife carried on said auxiliary frame adjacent and below the rear upper end of said conveyor positioned for cutting said tops from said onions as the onions are carried up said conveyor and suspended by their tops from the latter.

4. An onion harvester comprising a vehicle supported for movement over the ground in one general direction of travel, elements carried by said vehicle adjacent the forward end of the latter relative to said direction of travel, said elements being spaced apart laterally of said direction of travel and adapted to engage under the opposite sides of the tops of onions and elevate said tops when said tops are lying on the ground and said onions are in the latter, means including an auxiliary frame pivotally connected with said main frame supporting said elements on said vehicle for swinging said elements oppositely laterally and vertically relative to said vehicle during said movement over the ground and means accessible to an operator on said vehicle connected with said main frame and with said auxiliary frame for so swinging said elements.

5. An onion harvester comprising a vehicle supported for movement over the ground in one general direction of travel, elements carried by said vehicle adjacent the forward end of the latter relative to said direction of travel, said elements being spaced apart laterally of said direction of travel and adapted to engage under the opposite sides of the tops of onions and elevate said tops when said tops are lying on the ground and said onions are in the latter, means including an auxiliary frame pivotally connected with said main frame supporting said elements on said vehicle for swinging said elements oppositely laterally and vertically relative to said vehicle during said movement over the ground and means connected with said main frame and with said auxiliary frame accessible to an operator on said vehicle for so swinging said elements, a pair of endless chains extending rearwardly and upwardly from said elements with said chains having adjacent elongated reaches between which the said tops are adapted to be gripped upon rearward movement of said reaches, means for so moving said reaches, and a rotatably supported wheel adjacent the forward end of one of said reaches in a plane generally parallel to the plane of the latter and having radially extending teeth therein adapted to engage said tops for directing the latter between said reaches, and means for rotating said wheel.

6. An onion harvester comprising a vehicle supported for movement over the ground in one general direction of travel, elements carried by said vehicle adjacent the forward end of the latter relative to said direction of travel, said elements being positioned to engage below the tops of onions when said tops are on the ground, and said elements being upwardly and rearwardly inclined for elevating said tops upon forward movement of said vehicle over the ground, means supporting said elements on said vehicle for lateral opposite movement of said elements and for vertical opposite movement relative to the ground and to said vehicle and manually actuatable means connected with said elements for so swinging them.

7. An onion harvester comprising a vehicle supported for movement over the ground in one general direction of travel, elements carried by said vehicle adjacent the forward end of the latter relative to said direction of travel, said elements being positioned to engage below the tops of onions when said tops are on the ground, and said elements being upwardly and rearwardly inclined for elevating said tops upon forward movement of said vehicle over the ground, means including a frame pivotally connected with said vehicle supporting said elements on said vehicle for lateral opposite movement of said elements and for vertical opposite movement relative to the ground and to said vehicle, a top gripping conveyor extending rearwardly and upwardly from said elements including top gripping members for gripping the tops so elevated and for pulling the onions attached thereto from the ground upon rearward movement of said members, means for so moving said members, said conveyor being supported on said frame for said lateral and vertical movement with said elements and manually actuatable means accessible to an operator on said vehicle connected with said elements for so moving them laterally and vertically.

8. An onion harvester comprising a vehicle supported for movement over the ground in one general direction of travel, elements carried by said vehicle adjacent the forward end of the latter relative to said direction of travel, said elements being positioned to engage below the tops of onions when said tops are on the ground, and said elements being upwardly and rearwardly inclined for elevating said tops upon forward movement of said vehicle over the ground, supporting means supporting said elements on said vehicle for lateral opposite movement of said elements and for vertical opposite movement relative to the ground and to said vehicle, means for so moving said elements a top gripping conveyor extending rearwardly and upwardly from said elements including top gripping members for gripping the tops so elevated and for pulling the onions attached thereto from the ground upon rearward movement of said members, means for so moving said members, said conveyor being supported on said supporting means for movement with said elements, said supporting means including a single pivot securing said elements and said conveyor to said vehicle for said lateral and vertical movement of said elements earth digging members connected with said pivot for movement with said elements and conveyor, said earth digging members being positioned for digging into the ground at a level below said onions upon the latter being gripped by said conveyor.

9. In an onion harvester having ground wheels supporting the same for movement over the ground in generally one direction and having a pair of upwardly and rearwardly elongated and inclined endless chains supported on sprocket wheels at their lower and upper ends with one of their inclined longitudinally extending runs being in substantial engagement for gripping onion tops therebetween, means supporting said chains with their lower ends leading relative to the direction of travel of said harvester, shafts supporting the lower sprocket wheels of said pair for revolution and a wheel on one of said shafts having radially extending arms projecting beyond the periphery of the sprocket wheel that is on the same shaft for directing onion tops to between said runs upon movement of the latter upwardly, and means for rotating one of the sprockets around which each chain extends for causing said movement.

10. In an onion harvester having ground wheels supporting the same for movement over the ground in generally one direction and having a pair of upwardly and rearwardly elongated and inclined endless chains supported on sprocket wheels at their lower and upper ends with one of their inclined longitudinally extending runs being in substantial engagement for gripping onion tops therebetween, means supporting said chains with their lower ends leading relative to the direction of travel of said harvester, shafts supporting the lower sprocket wheels of said pair for revolution and a wheel on one of said shafts having radially extending arms projecting beyond the periphery of the sprocket wheel that is on the same shaft for directing onion tops to between said runs upon movement of the latter upwardly, and means for rotating one of the sprockets around which each chain extends for causing said movement, a pair of elements adjacent and ahead of said lower ends of said chains adapted to slide below onion tops when the latter are on the ground, said elements being elongated and extending longitudinally of said adjacent runs in substantial alignment therewith, means supporting said elements for swinging their forward ends laterally relative to said direction of travel of said harvester, and means accessible to an operator on said harvester and connected with said elements for so swinging the latter.

11. In an onion harvester including an elongated main frame having a forward end and a rear end and spaced side frame members extending between said forward and rear ends, an elongated auxiliary frame disposed between said side frame members and extending longitudinally thereof and having a front end at a point adjacent said forward end of said main frame, a pair of wheels on the rear end of said main frame supporting said rear end for movement over the ground, a ground wheel at said one end of said auxiliary frame supporting said front end thereof for movement over the ground, said auxiliary frame having a rear end terminating between said side frame members near the rear end of said main frame than its forward end, means securing the rear end of said auxiliary frame to said main frame for lateral swinging of said front end relative to said forward end of said main frame, means on said front end for supporting the forward end of said main frame during said swinging of said front end, means for so swinging said front end, and onion pulling means on said auxiliary frame movable therewith for engaging and pulling onions from the ground by their tops during movement of said harvester over the ground, said means for swinging the front end of said auxiliary frame including a manually operable handle positioned adjacent one of said side frame members and carried by the latter, a seat for an operator on said main frame at one side of said onion pulling means and at a point adjacent said handle and in a position for viewing of the ground and onions ahead of said onion pulling means.

THOMAS R. WARNER.

References Cited in the file of this patent
UNITED STATES PATENTS

| Number | Name | Date |
|---|---|---|
| 1,479,929 | Ricks | Jan. 8, 1924 |
| 1,766,293 | Grimes | June 24, 1930 |
| 1,935,972 | Zuckerman | Nov. 21, 1933 |
| 1,956,676 | Gray et al. | May 1, 1934 |
| 2,421,534 | Andrus | June 3, 1947 |
| 2,432,956 | Walz et al. | Dec. 16, 1947 |
| 2,433,799 | Walz et al. | Dec. 30, 1947 |
| 2,436,831 | Silva | Mar. 2, 1948 |
| 2,470,211 | Bozeman et al. | May 17, 1949 |
| 2,471,771 | Parks et al. | May 31, 1949 |
| 2,476,336 | Urschel | July 19, 1949 |